(12) United States Patent
Tamai et al.

(10) Patent No.: US 11,173,729 B2
(45) Date of Patent: Nov. 16, 2021

(54) RECORDING APPARATUS

(71) Applicant: SEIKO EPSON CORPORATION, Tokyo (JP)

(72) Inventors: Satoshi Tamai, Matsumoto (JP); Yasuo Sunaga, Matsumoto (JP); Keisuke Niwa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/061,831

(22) Filed: Oct. 2, 2020

(65) Prior Publication Data

US 2021/0101392 A1 Apr. 8, 2021

(30) Foreign Application Priority Data

Oct. 3, 2019 (JP) .............................. JP2019-182764

(51) Int. Cl.
*B41J 11/00* (2006.01)
*B41J 13/00* (2006.01)
*B41J 13/10* (2006.01)

(52) U.S. Cl.
CPC ......... *B41J 11/0045* (2013.01); *B41J 13/106* (2013.01)

(58) Field of Classification Search
CPC .. B41J 11/0045; B41J 13/0054; B41J 13/106; B41J 2/01; B65H 2511/13; B65H 2515/805; B65H 2511/11; B65H 2405/324; B65H 31/20; B65H 31/02; B65H 2801/15; B65H 29/22; B65H 31/00; B65H 2701/1924; B65H 2801/03
See application file for complete search history.

(56) References Cited

U.S. PATENT DOCUMENTS

| | | | |
|---|---|---|---|
| 7,070,350 B2 * | 7/2006 | Inokuchi | B41J 11/006 271/171 |
| 2005/0162494 A1 * | 7/2005 | Inokuchi | B41J 13/106 347/104 |
| 2006/0204310 A1 | 9/2006 | Inokuchi et al. | |

FOREIGN PATENT DOCUMENTS

JP 2003-338873 A 12/2004

* cited by examiner

*Primary Examiner* — Huan H Tran
(74) *Attorney, Agent, or Firm* — Workman Nydegger (57) ABSTRACT

A recording apparatus includes an apparatus main body including a recording portion, a media receiving portion configured to be displaced along a discharge direction in which the first medium and the second medium are discharged, and that is displaced between a storage position in which the media receiving portion is stored in the apparatus main body and stacking positions in which the media receiving portion protrudes from the storage position and receives the media, a drive source that drives the media receiving portion, at the stacking positions, discharges the second medium after having received the first medium at a first position, the media receiving portion is displaced to a second position downstream of the first position in the discharge direction at a timing at which a downstream end portion of the to-be-discharged second medium in the discharge direction overlaps the first medium at the first position.

7 Claims, 7 Drawing Sheets

RECORDING APPARATUS

The present application is based on, and claims priority from JP Application Serial Number 2019-182764, filed Oct. 3, 2019, the disclosure of which is hereby incorporated by reference herein in its entirety.

BACKGROUND

1. Technical Field

The present disclosure relates to a recording apparatus.

2. Related Art

To date, as illustrated in JP-A-2004-338873, there is a known image recording apparatus that includes a multi-stage paper discharge tray in which a plurality of tray plates are mutually slidably assembled in a discharge direction.

In the above apparatus, the paper discharge tray can be expanded and contracted in accordance with a size of a recording paper to be printed on. For example, when printing on an A4-size A4 paper sheet, the paper discharge tray extends to a position corresponding to the A4 paper sheet. In addition, when printing on an A3-size A3 paper sheet, which is longer in the discharge direction than the A4 paper sheet, the paper discharge tray is further extended to a position corresponding to the A3 paper sheet. Here, when printing is performed on an A3 paper sheet with an A4 paper sheet placed on the paper discharge tray, the paper discharge tray further extends in the discharge direction as described above. At this time, the already placed A4 paper sheet moves in the discharge direction along with the movement of the paper discharge tray by extension. Consequently, there is a problem in that a front end portion of the to-be-discharged A3 paper sheet comes into contact with a rear end portion of the A4 paper sheet, the A3 paper sheet pushes the A4 paper sheet in the discharge direction, and the A4 paper sheet falls off the paper discharge tray.

Further, the above problem is a common problem when printing on a paper sheet having a size larger than the paper sheet already placed on the paper discharge tray.

SUMMARY

According to an aspect of the present disclosure, a recording apparatus includes an apparatus main body including a recording portion configured to record on a first medium and a second medium larger than the first medium, a media receiving portion configured to be displaced along a discharge direction in which the first medium and the second medium are discharged, and that is displaced between a storage position in which the media receiving portion is stored on the apparatus main body side and stacking positions in which the media receiving portion protrudes in the discharge direction from the storage position and receives the media, a drive source that drives the media receiving portion for the displacement between the storage position and the stacking positions, and a transmitter that transmits the power of the drive source to the media receiving portion, in which the stacking positions of the media receiving portion include a first position and a second position that protrudes downstream from the first position, and, after receiving the first medium at the first position, when the second medium is discharged, the media receiving portion is displaced to the second position downstream of the first position in the discharge direction at a timing when a downstream end portion of the to-be-discharged second medium in the discharge direction overlaps the first medium at the first position by a predetermined amount.

In the recording apparatus, the media receiving portion may include a first tray and a second tray slidably coupled to the first tray in the discharge direction, at the storage position, the media receiving portion may be in a first state in which the first tray and the second tray overlap each other, and, at the stacking positions, the media receiving portion may be in a second state in which the second tray is located downstream of the first tray in the discharge direction.

In the recording apparatus, after the first tray and the second tray have been moved to the first position and received the first medium while in the second state, and when the second medium is to be discharged, at a timing at which the downstream end portion of the to-be-discharged second medium in the discharge direction overlaps the first medium at the first position by a predetermined amount of the second medium, in a state in which the second state is maintained, only the first tray may move downstream in the discharge direction and the media receiving portion is displaced to the second position.

The recording apparatus may further include transport rollers that transport the first medium and the second medium and that are provided upstream of the recording portion, in which, when the second medium passes through the transport rollers, the media receiving portion is displaced to the second position.

In the recording apparatus, the media receiving portion is preferably displaced to the second position in accordance with a print duty of the second medium.

In the recording apparatus, the media receiving portion is preferably displaced to the second position in accordance with a thickness of the second medium.

The recording apparatus may further include an operation panel provided with a storage button for storing the media receiving portion on the apparatus main body side, in which the storage button is displayed when it is possible to store the media receiving portion on the apparatus main body side, and is hidden when it is not possible to store the media receiving portion on the apparatus main body side.

DESCRIPTION OF EXEMPLARY EMBODIMENTS

1. First Embodiment

Figure 1:
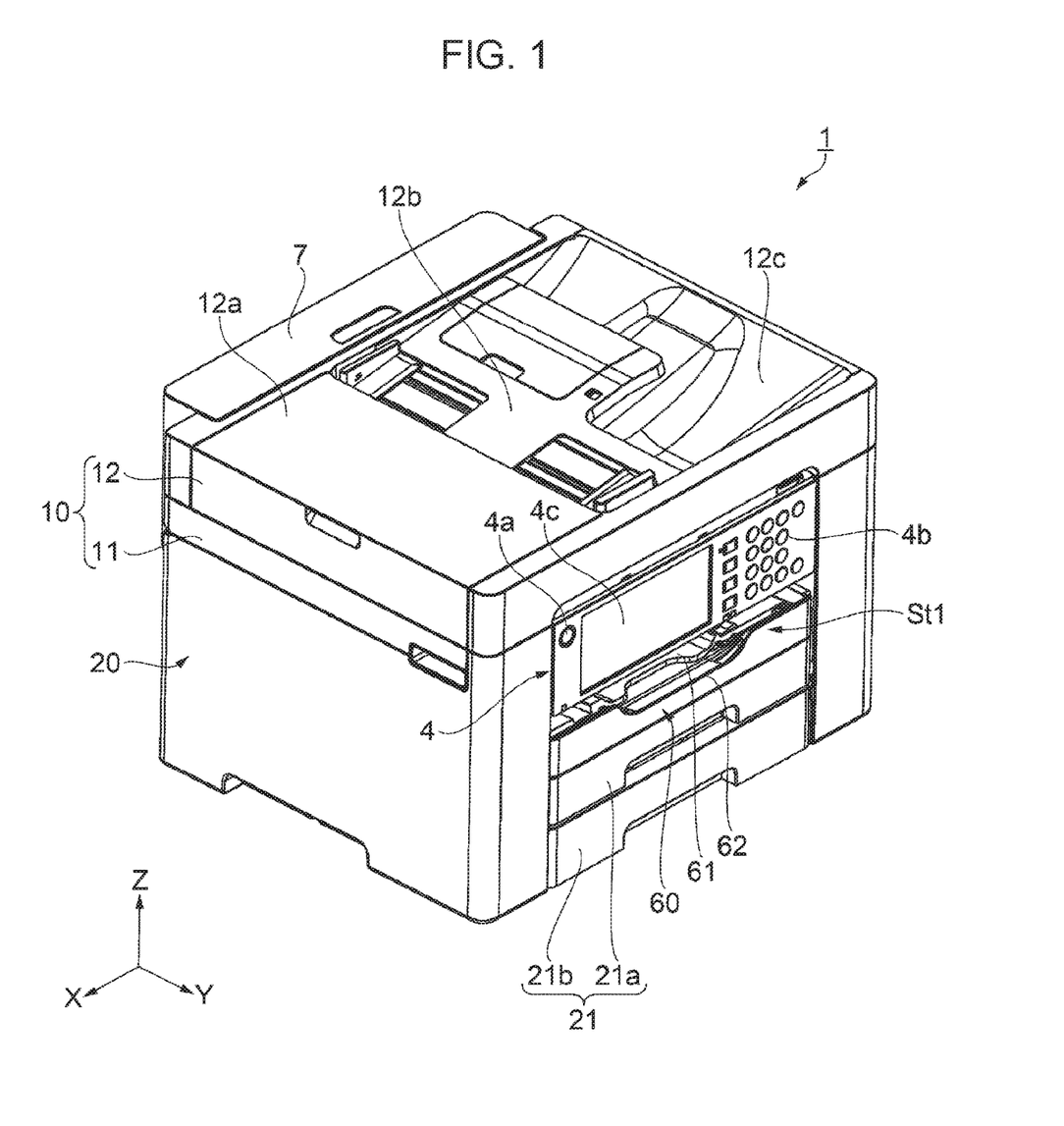
FIG. 1 is an external perspective view illustrating a configuration of a recording apparatus.
Figure 2:
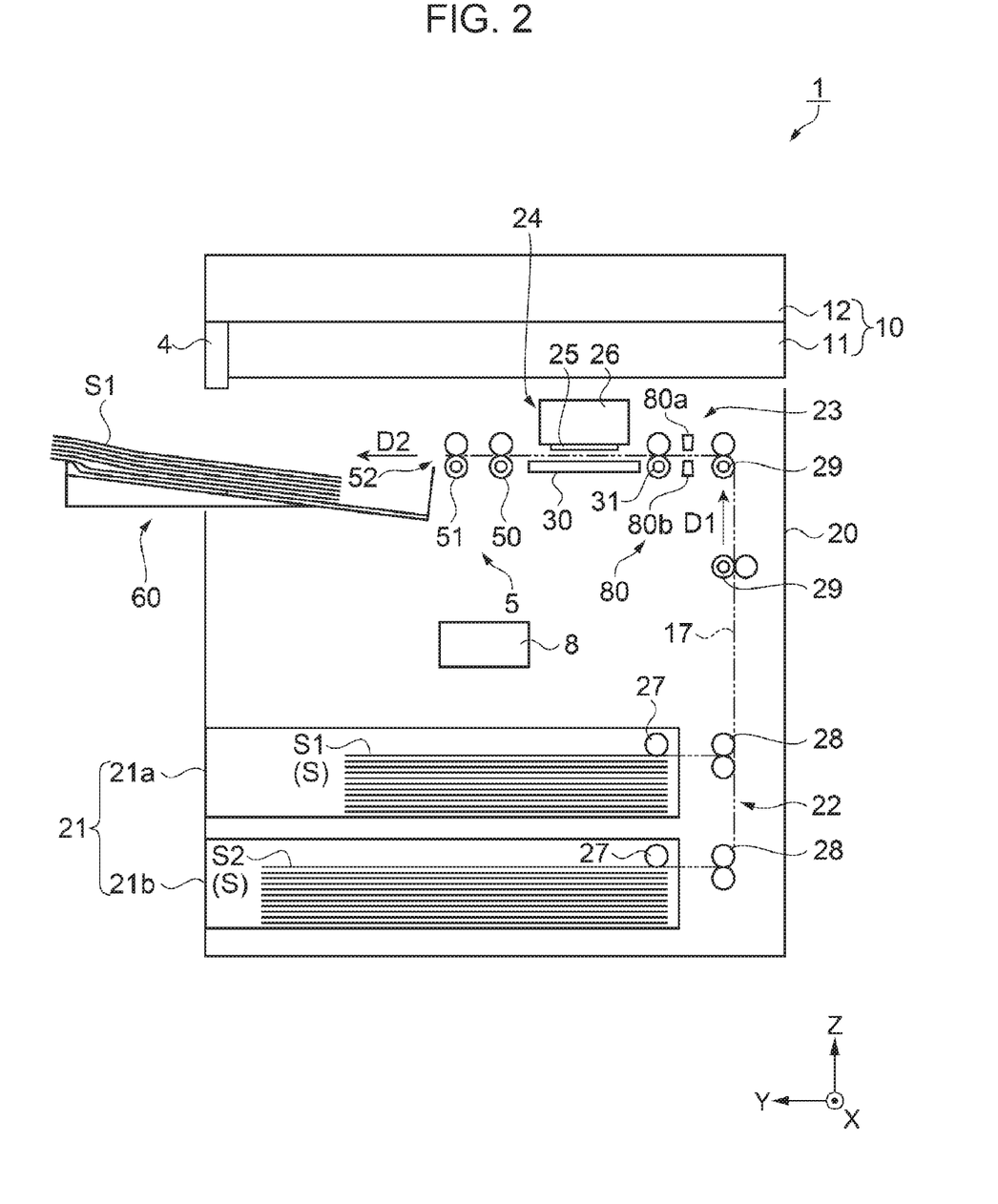
FIG. 2 is a schematic sectional view illustrating the configuration of the recording apparatus.

First, a configuration of a recording apparatus 1 will be described. FIG. 1 is an external perspective view illustrating the recording apparatus 1, and FIG. 2 is a schematic sectional view illustrating the configuration of the recording apparatus 1. The recording apparatus 1 is, for example, an ink jet printer.

For convenience of explanation, an XYZ coordinate system is used with reference to a case where the recording apparatus 1 is placed on a horizontal plane. Specifically, when the recording apparatus 1 is viewed from a front side (a surface side of an operation portion 4) with a left-right direction as the X direction, the left direction or the left side is the +X direction, and the right direction or the right side is the −X direction. A front-rear direction, which is perpendicular to the X direction of the recording apparatus 1 in the horizontal plane, is the Y direction, and the front, front side, or front surface side is the +Y direction, and the rear, rear side, or rear surface side is the −Y direction. Then, a direction perpendicular to the X and Y directions of the recording apparatus 1, that is, a direction perpendicular to the horizontal plane is the Z direction, upward or the upper side is the +Z direction, and downward (direction of gravity) or the lower side is the −Z direction. The directions are defined as described above, and are appropriately used in the following description. Further, the X direction is a width direction of a paper sheet S as a medium, and is a scanning direction of a recording head 25. In addition, the Y direction is a depth direction of the recording apparatus 1 and a length direction of the paper sheet S.

As illustrated in FIG. 1, the recording apparatus 1 includes an apparatus main body 20 and a scanner unit 10 disposed on an upper portion of the apparatus main body 20, and is configured as a so-called multifunction machine. The apparatus main body 20 has a function of recording on the paper sheet S.

The scanner unit 10 includes a first reading apparatus 11 and a second reading apparatus 12 disposed on an upper portion of the first reading apparatus 11. The first reading apparatus 11 is a flatbed-type scanner and has a contact image sensor (not illustrated). A user opens the second reading apparatus 12 with respect to the first reading apparatus 11 to expose a document placement surface (not illustrated) that is an upper surface of the first reading apparatus 11. Next, a document to be read is placed on the exposed document placement surface of the first reading apparatus 11, the second reading apparatus 12 is closed, and a predetermined switch operation is performed from the operation portion 4. As a result, the first reading apparatus 11 can read characters, symbols, drawings, and the like drawn on the document placed on the document placement surface as images and convert them as graphics data.

The second reading apparatus 12 has a document supply unit 12*a*. The document supply unit 12*a* supplies the document, which has been placed on a document placement tray 12*b*, to the second reading apparatus 12. The second reading apparatus 12 includes an auto document feeder (ADF), reads the supplied document as an image, and discharges the read document to a document discharge tray 12*c*.

The operation portion 4 for operating the recording apparatus 1 is provided on the front surface side of the recording apparatus 1. The operation portion 4 is a horizontally long panel in a direction along the X direction, and is provided with a power button 4*a* that is operated when the recording apparatus 1 is to be turned on or off, input buttons 4*b* that enable various operation information to be input, and an operation panel 4*c* provided with a display of an operation state of the recording apparatus 1 and operation buttons of the recording apparatus 1. The operation panel 4*c* is a touch panel.

As illustrated in FIG. 2, in the apparatus main body 20, a transport path 17 indicated by the chain double-dashed line is set, and the paper sheet S is transported in a transport direction D1. The apparatus main body 20 is configured to include paper sheet cassettes 21, a feeding portion 22, a transport portion 23, a recording portion 24, a discharge portion 5, a control portion 8 and the like therein.

At the bottom of the recording apparatus 1, the paper sheet cassettes 21 are removably installed in the apparatus main body 20. Each of the paper sheet cassettes 21 is a housing portion configured to house paper sheets S in a stacked state. In the present embodiment, the paper sheet cassettes 21 include a paper sheet cassette 21*a* that houses a paper sheet S1 as a first medium and a paper sheet cassette 21*b* that houses a paper sheet S2 as a second medium that is larger than the paper sheet S1. The paper sheet S1 is, for example, an A4-size paper sheet, and the paper sheet S2 is, for example, an A3-size paper sheet.

The feeding portion 22 feeds the paper sheets S stored in the paper sheet cassettes 21 to the transport portion 23. The feeding portion 22 includes pickup rollers 27 that send out the uppermost paper sheet S among the paper sheets S housed in the paper sheet cassettes 21 in a stacked state, and pairs of separation rollers 28 that separate the paper sheets S sent by the pickup roller 27 one by one. Further, the feeding portion 22 includes a feeding motor (not illustrated) for driving the pickup rollers 27 to rotate. The pickup rollers 27 and the pairs of separation rollers 28, which correspond to the paper sheet cassettes 21*a* and 21*b* on which the paper sheets S used for recording (printing) are stacked, are driven to feed the paper sheets S used for recording to the transport portion 23.

The transport portion 23 transports the fed sheet S to the recording portion 24. The transport portion 23 includes pairs of transport rollers 29 and 31 that rotate in accordance with the driving of a transport motor (not illustrated), and transports the paper sheet S along the transport path 17. In addition, a platen 30 is provided at a position facing the recording portion 24 along the transport path 17. The paper sheet S is transported while being attracted to the support surface (upper surface) of the platen 30.

In addition, in this embodiment, a detection portion 80 that detects the presence or absence of the paper sheet S to be transported is disposed between the pairs of transport rollers 29 and the pair of transport rollers 31 in the transport direction D1. In the detection portion 80 of the embodiment, a light emitting portion 80*a* that emits light and a light receiving portion 80*b* that receives the light emitted from the light emitting portion 80*a* are disposed so as to face each other across the transport path 17. The light emitting portion 80*a* is formed of, for example, a light emitting diode (LED) light emitting element, a laser light emitting element, or the like, and the light receiving portion 80*b* is formed of a phototransistor, a photo IC, or the like. The detection portion 80 is coupled to the control portion 8. The control portion 8 determines the presence or absence of the paper sheet S on the basis of the received light amount data transmitted from the detection portion 80. For example, the control portion 8 determines that the paper sheet S is present when the received light amount data is lower than a threshold value, and determines that the paper sheet S is not present when the received light amount data is equal to or more than the threshold value.

The recording portion 24 includes the recording head 25 that ejects ink as a liquid toward the paper sheet S, a carriage 26 that is equipped with the recording head 25 and that is configured to move in a width direction (X direction) that intersects the transport direction D1 (+Y direction) of the paper sheet S, and an ink cartridge (not illustrated) that supplies ink to the recording head 25. The recording head 25 is provided at a position facing the platen 30 with the transport path 17 interposed therebetween.

The recording portion 24, by ejecting ink on the basis of the recording data (print data) onto the paper sheet S supported and transported on the platen 30, performs recording (printing) by depositing ink to form an image based on the recording data. The recording data is generated on the basis of graphics data including text data and image data to be recorded on the paper sheet S, and is used to cause the recording apparatus 1 to perform recording. Further, the paper sheet S, which has been recorded on, is transported by the transport portion 23 and is sent to the discharge portion 5 provided downstream of the recording head 25 in the transport direction D1.

The discharge portion 5 includes a pair of paper discharge rollers 50 provided downstream of the recording portion 24 in the transport direction D1 and a pair of paper discharge rollers 51 provided downstream of the pair of paper discharge rollers 50 in the transport direction D1. The discharge portion 5 discharges the paper sheet S, which has been recorded on, from a discharge port 52 along a discharge direction D2 to a discharge tray 60 as a media receiving portion by the pairs of paper discharge rollers 50 and 51. Further, when recording on and discharging paper sheets S continuously, the discharged paper sheets S are sequentially stacked and each is stacked on the previously discharged paper sheet S.

The control portion 8 controls the feeding portion 22, the transport portion 23, the recording portion 24, the discharge portion 5, the discharge tray 60, the operation panel 4c, and the like. In addition, the control portion 8 cooperates with a scanner control portion (not illustrated) included in the scanner unit 10 to perform overall control of the recording apparatus 1.

In addition, in the recording apparatus 1 of this embodiment, the apparatus main body 20 has a configuration in which it is possible for the paper sheet S to, as well as be supplied to the paper sheet cassettes 21a and 21b, be set and fed from the rear surface side of the apparatus main body 20. Specifically, a cover 7 that is configured to be opened and closed is provided on the rear side of the apparatus main body 20, and by opening the cover 7, a paper sheet setting port (not illustrated) is exposed, and it is possible to set the paper sheet S in the paper sheet setting port.

Figure 3:
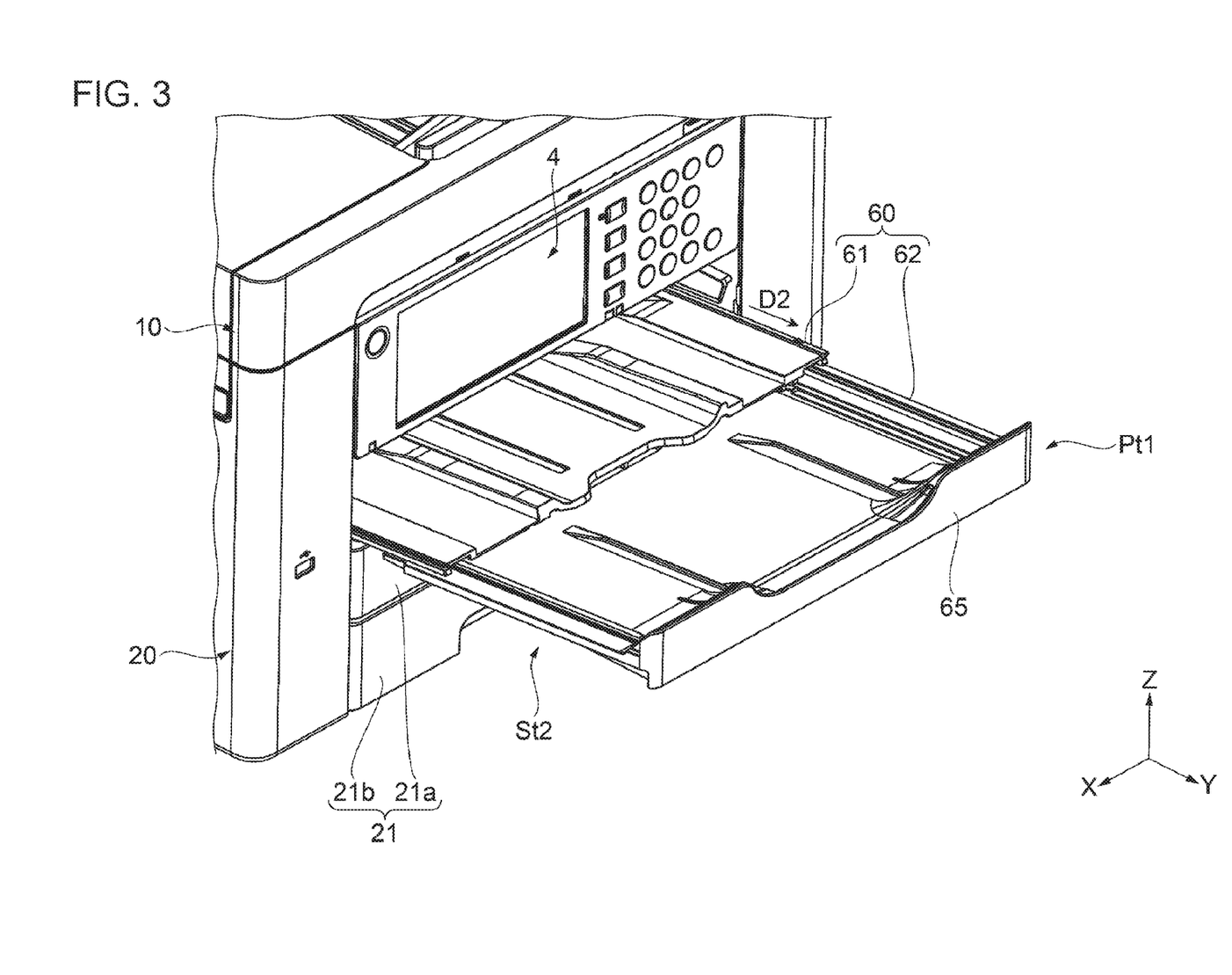
FIG. 3 is a perspective view illustrating a configuration of a discharge tray.
Figure 4:
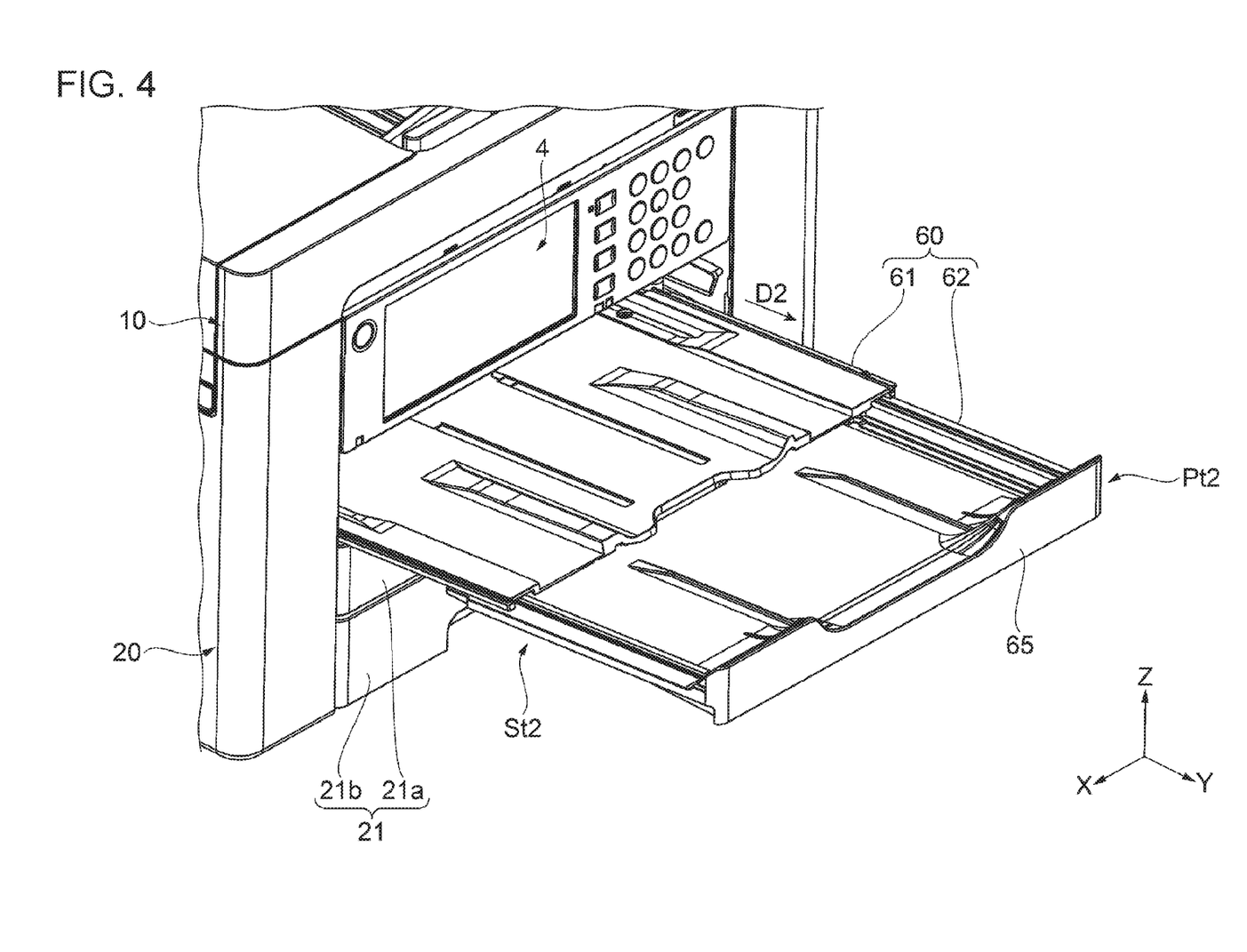
FIG. 4 is a perspective view illustrating the configuration of the discharge tray.

Next, the configuration of the discharge tray 60 will be described. FIGS. 3 and 4 are perspective views illustrating the configuration of the discharge tray 60. Specifically, FIG. 3 illustrates a state of the discharge tray 60 when, for example, an A4-size paper sheet S1 is to be discharged, and FIG. 4 illustrates a state of the discharge tray 60 when, for example, an A3-size paper sheet S2 is to be discharged.

The discharge tray 60 is configured to be displaceable along the discharge direction D2. Specifically, the discharge tray 60 protrudes from the apparatus main body 20 in the discharge direction D2 by a displacement amount that differs in accordance with the respective paper sheets S1 and S2. In other words, the amount of extension from the apparatus main body 20 differs.

In addition, as illustrated in FIG. 1, the discharge tray 60 is displaced between a storage position in which the discharge tray 60 is stored on the apparatus main body 20 side and, as illustrated in FIGS. 3 and 4, stacking positions in which the discharge tray 60 protrudes from the storage position in the discharge direction D2 and receives the paper sheets S. Further, in the figures, the discharge direction D2 corresponds to the +Y direction. When receiving the paper sheet S1 discharged from the discharge port 52, the discharge tray 60 is displaced to a first position Pt1 as illustrated in FIG. 3. In addition, when receiving the paper sheet S2 discharged from the discharge port 52, the discharge tray 60 is displaced to a second position Pt2 downstream of the first position Pt1 in the discharge direction D2 as illustrated in FIG. 4. That is, since the paper sheet S2 is longer than the paper sheet S1 in the discharge direction D2, the discharge tray 60 is displaced to the second position Pt2 where the displacement amount is larger in the discharge direction D2 than the first position Pt1, and the paper sheet S2 is prevented from falling off the discharge tray 60. Further, the storage position of the discharge tray 60 may be a state in which the discharge tray 60 is completely stored inside the apparatus main body 20, or a state in which a +Y direction front end portion of the discharge tray 60 slightly protrudes from the apparatus main body 20.

The discharge tray 60 includes a first tray 61 and a second tray 62. The first tray 61 and the second tray 62 are slidably coupled in the discharge direction D2. Specifically, the second tray 62 is located below the first tray 61, and the second tray 62 is coupled to the first tray 61 so as to be extendable and contractible in the +Y direction and the −Y direction, respectively.

In the case where the discharge tray 60 is located at the storage position, as illustrated in FIG. 1, the discharge tray 60 is in a first state St1 in which the first tray 61 and the second tray 62 overlap each other, and the paper sheets are stored in the apparatus main body 20. In the first state St1, almost the entirety of the second tray 62 overlaps the lower surface of the first tray 61.

On the other hand, in the case where the discharge tray 60 is located at the stacking positions, as illustrated in FIGS. 3 and 4, the discharge tray 60 is in the second state St2 in which the second tray 62 is located downstream of the first tray 61 in the discharge direction D2. As a result, the recording apparatus 1 can be reduced in size and the area occupied by the recording apparatus 1 can be reduced.

In the case where the discharge tray 60 moves from the storage position to the stacking positions, a drive motor (not illustrated) as a drive source is drive-controlled by the control portion 8 in accordance with the size of the paper sheet S to be recorded on, and displacement of the discharge tray 60 illustrated in FIG. 3 to the first position Pt1 and displacement of the discharge tray 60 illustrated in FIG. 4 to the second position Pt2 are possible. The direction in which the discharge tray 60 protrudes is not horizontal but is set so as to be inclined slightly upward. This reduces the momentum of the discharged paper sheet S.

A case where the discharge tray 60 is displaced to the first position Pt1 will be described with reference to FIG. 3. The discharge tray 60 has a rack (not illustrated) as a transmitter formed at one end of each of the first tray 61 and the second tray 62 in the width direction. The rack meshes with a pinion (not illustrated) that transmits the power of a drive motor for driving.

In the case where recording is performed on the paper sheet S1, first, the second tray 62 is extended downstream from the first tray 61 in the discharge direction D2 as a result of the drive motor being driven in accordance with an instruction from the control portion 8, the pinion rotating following the driving of the drive motor, and, the rack, which meshes with the pinion, moving. After the second tray 62 has been extended to the maximum with respect to the first tray 61, the first tray 61, by the same operation, extends from the stored position downstream in the discharge direction D2 and is displaced to the first position Pt1 while the second tray 62 is maintained in the state in which it has been extended to the maximum. Here, the state in which the second tray 62 has been extended to the maximum with respect to the first tray 61 is the second state St2.

Further, the discharge tray 60 is set such that the downstream end portion of the paper sheet S1 stops when it has passed over a front end receiving portion 65 to some extent, the front end receiving portion 65 having a projecting portion provided at the downstream front portion of the second tray 62 in the discharge direction D2.

Next, a case where the discharge tray 60 is displaced to the second position Pt2 will be described with reference to FIG. 4. Similarly to the above, the discharge tray 60 is displaced via the rack by the driving of the drive motor. Specifically, first, the discharge tray 60 takes the second state St2 in which the second tray 62 extends downstream in the discharge direction D2 with respect to the first tray 61. Then, while maintaining the second state St2, the discharge tray 60 is extended from the stored position downstream in the discharge direction D2. Here, while maintaining the second state St2, the amount of displacement of the discharge tray 60 extending downstream in the discharge direction D2 from the stored position is larger than the amount of displacement up to the first position Pt1. As a result, the discharge tray 60 is displaced to the second position Pt2.

In the case where recording is performed on the paper sheet S2, the discharge tray 60 located at the second position Pt2 is set so that the second tray 62 extends to the maximum extent with respect to the first tray 61, and takes the second state St2 as in the case of the discharge tray 60 at the first position Pt1. On the other hand, the discharge tray 60 at the second position Pt2 is set such that the amount of extension of the first tray 61 is larger than that of the discharge tray 60 at the first position Pt1.

At the second position Pt2 of the discharge tray 60, the discharge tray 60 is set so that the length-direction downstream front end portion of the paper sheet S2 stops when it has passed over the front end receiving portion 65 of the second tray 62 to some extent.

Further, in the case where the discharge tray 60 that has been extended from the apparatus main body 20 is to be stored on the apparatus main body 20 side, the operation can be performed manually or automatically. In the case of manual operation, the user pushes the front end receiving portion 65 with both hands in a direction opposite to the discharge direction D2. Further, the apparatus main body 20 includes a ratchet mechanism (not illustrated) in the discharge portion 5. Therefore, the ratchet mechanism operates through application of a force of a predetermined value or more to the pinion by the pushing force of the user, the pinion rotates in the reverse direction, and the second tray 62 is housed on the lower surface of the first tray 61. Subsequently, the first tray 61, which supports the second tray 62 on its lower surface, moves to the apparatus main body 20 side. By this operation, the discharge tray 60 can be moved to the storage position. Further, the case of performing the operation automatically will be mentioned later.

Next, the operation of the discharge tray 60 will be described. In this embodiment, a case will be described where, in a state where the A4-size paper sheet S1 has been recorded on by the recording portion 24 and placed on the discharge tray 60, the A3-size paper sheet S2 is recorded on by the recording portion 24 and is discharged toward the discharge tray 60. FIGS. 5A to 5D are schematic views illustrating the operation of the discharge tray 60.

Figure 5A:
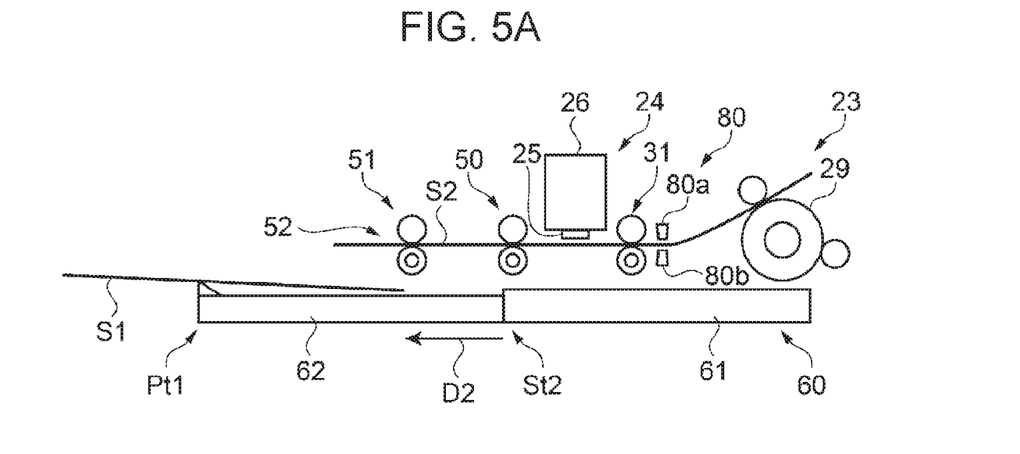
FIG. 5A is a schematic view illustrating operation of the discharge tray.

First, when a print job for performing printing on the A4-size paper sheet S1 is transmitted from a user, the control portion 8 drives the feeding portion 22, the transport portion 23, the recording portion 24, the discharge portion 5, the discharge tray 60, and the like. Specifically, printing is performed on the paper sheet S1 transported from the paper sheet cassette 21a, and the printed sheet S1 is discharged in the discharge direction D2.

Then, as illustrated in FIG. 5A, when the print job of the A4 size paper sheet S1 is received, the control portion 8 displaces the discharge tray 60 to the first position Pt1 corresponding to the paper sheet S1. The discharge tray 60 takes the second state St2 in which the driving of the drive motor is transmitted to the rack, and the second tray 62 extends downstream of the first tray 61 in the discharge direction D2. Then, while maintaining the second state St2, the discharge tray 60 is extended from the stored position downstream in the discharge direction D2. As a result, the front end receiving portion 65 at the downstream end portion of the second tray 62 is displaced to the first position Pt1. The printed paper sheet S1 is placed on the discharge tray 60, which has been displaced up to the first position Pt1.

Next, a case will be described in which a print job for the A3-size paper sheet S2 is started in a state where the A4-size paper sheet S1 has been placed on the discharge tray 60.

When the print job of the A3-size paper sheet S2 is transmitted from a user, the control portion 8 drives the feeding portion 22, the transport portion 23, the recording portion 24, the discharge portion 5, the discharge tray 60, and the like. Specifically, as illustrated in FIGS. 5A and 5B, printing is performed on the paper sheet S2 transported from the paper sheet cassette 21b, and the printed paper sheet S2 is discharged in the discharge direction D2.

Here, when the print job of the paper sheet S2 is started, if the discharge tray 60 is immediately displaced to the second position Pt2 corresponding to the paper sheet S2, along with the movement of the discharge tray 60 in the discharge direction D2, the paper sheet S1 already placed on the discharge tray 60 also moves in the discharge direction D2. Then, the downstream end portion of the to-be-discharged A3-size paper sheet S2 in the discharge direction D2, contacts the upstream end portion of the A4-size paper sheet S1 in the discharge direction D2, and the paper sheet S1 is pushed out in the discharge direction D2 by the pressing force of the paper sheet S2 in the discharge direction D2, and the paper sheet S1 falls off the discharge tray 60.

Therefore, in this embodiment, when discharging the paper sheet S2 after receiving the paper sheet S1 at the first position Pt1, when the downstream end portion of the discharged paper sheet S2 in the discharge direction D2 overlaps the paper sheet S1 at the first position Pt1, the discharge tray 60 is displaced to the second position Pt2 downstream of the first position Pt1 in the discharge direction D2. That is, in the present embodiment, the discharge tray 60 is not displaced to the second position Pt2 immediately after the start of the print job of the paper sheet S2, but is displaced to the second position Pt2 at a predetermined timing.

Figure 5B:
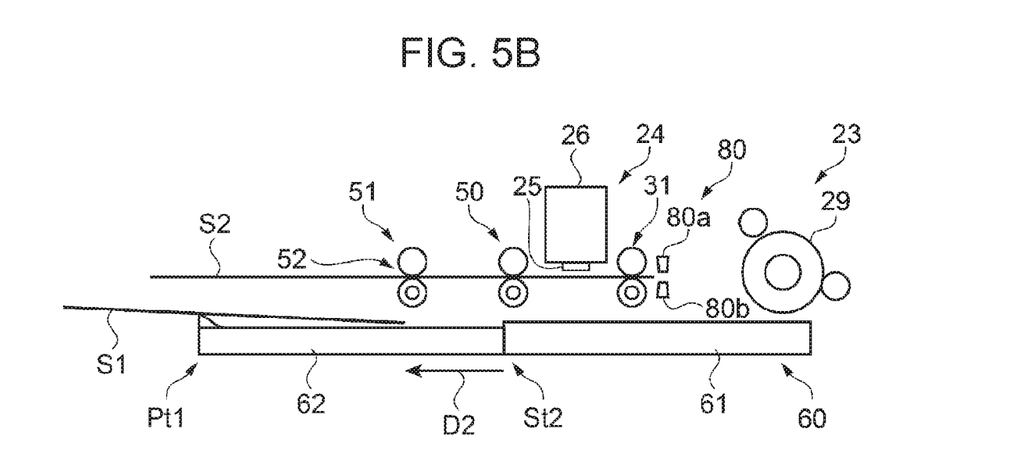
FIG. 5B is a schematic view illustrating the operation of the discharge tray.

In this embodiment, as illustrated in FIG. 5B, the discharge tray 60 is displaced to the second position Pt2 at a timing when it is determined that there is no paper sheet S2 being transported on the basis of received-light-amount data from the detection portion 80. The arrangement position of the detection portion 80 corresponds to the timing when the downstream end portion of the discharged sheet S2 in the discharge direction D2 overlaps the paper sheet S1 at the first position Pt1. Therefore, if the discharge tray 60 is displaced to the second position Pt2 at the timing when it is determined that there is no paper sheet S2, the downstream end portion of the paper sheet S2, which is to be discharged with certainty in the discharge direction D2, overlaps the paper sheet S1 at the first position Pt1.

Figure 5C:
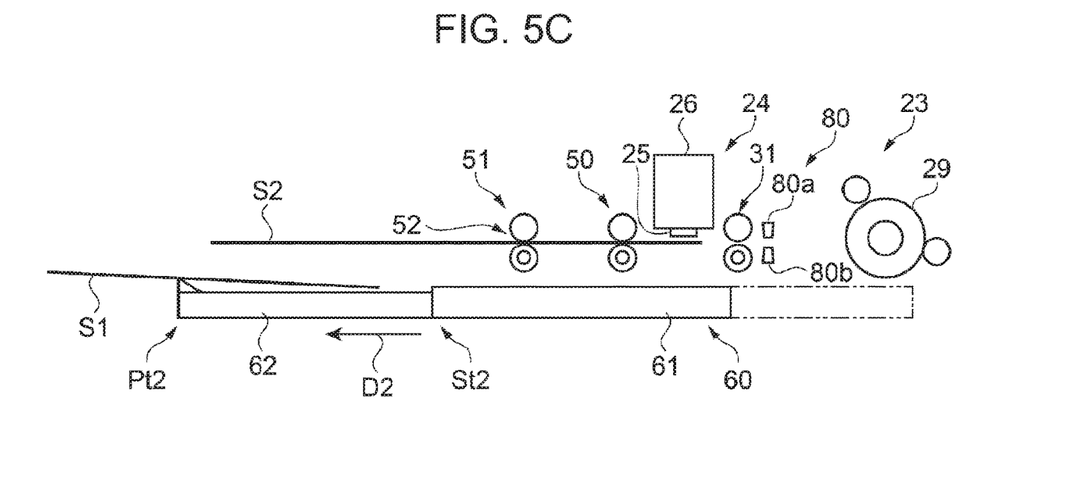
FIG. 5C is a schematic view illustrating the operation of the discharge tray.

Then, as illustrated in FIG. 5C, in a state in which the second state St2 is maintained, the first tray 61 moves downstream in the discharge direction D2 and the discharge tray 60 is displaced to the second position Pt2. That is, when the discharge tray 60 is displaced from the first position Pt1 to the second position Pt2, only the first tray 61 moves. By moving the first tray 61 downstream in the discharge direction D2, the discharge tray 60 is displaced to the second position Pt2 while maintaining the second state St2.

Figure 5D:
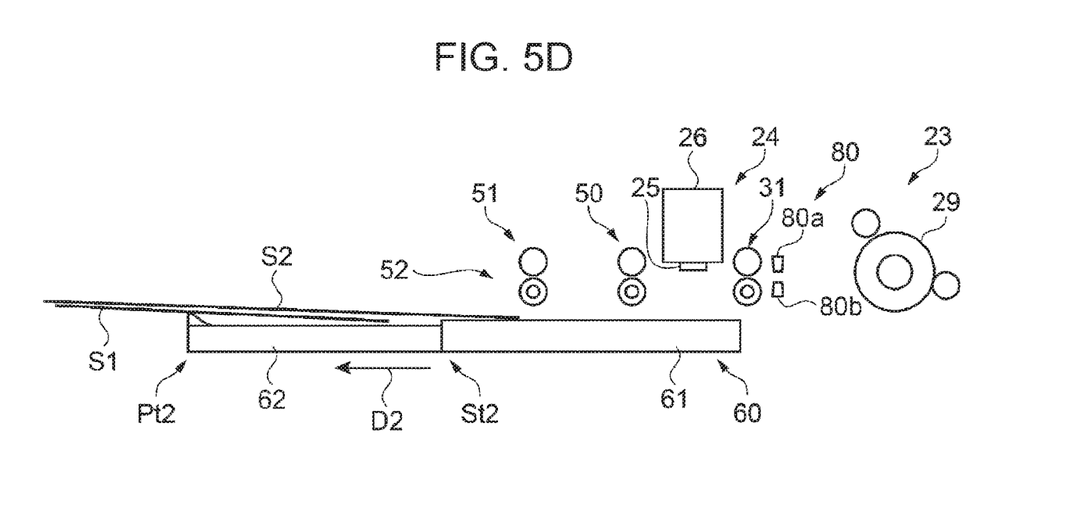
FIG. 5D is a schematic view illustrating the operation of the discharge tray.

Then, as illustrated in FIG. 5D, the discharged paper sheet S2 is stacked on the paper sheet S1 with the discharge tray 60 located at the second position Pt2.

When the paper sheet S2 is to be discharged in a state in which the paper sheet S1 has been placed on the discharge tray 60 at the first position Pt1, the discharge tray 60 is displaced to the second position Pt2 at the timing when the downstream end portion of the to-be-discharged paper sheet S2 in the discharge direction D2 overlaps the paper sheet S1 at the first position Pt1. That is, the to-be-discharged paper sheet S2 is placed on the paper sheet S1 with certainty. Therefore, because, when discharging the paper sheet S2, the downstream end portion of the paper sheet S2 in the discharge direction D2 does not come into contact with the upstream end portion of the paper sheet S1 in the discharge direction D2, and the paper sheet S2 does not push the paper sheet S1 out, it is possible to suppress the paper sheet S1 from falling off the discharge tray 60.

Further, in a configuration in which the discharge tray 60 is displaced to the second position Pt2 even in the case of printing on the paper sheet S1, the occupying dimensions of the recording apparatus 1 become unnecessarily large; however, in this embodiment, by changing the amount of displacement of the discharge tray 60 for the paper sheet S1 and the paper sheet S2, it is possible to prevent the occupying dimensions from expanding more than necessary.

When the discharge tray 60 is displaced from the first position Pt1 to the second position Pt2, since the configuration is such that only the first tray 61 is moved while the second state St2 is maintained, the size of the recording apparatus 1 can be reduced as compared with a configuration in which only the second tray 62 downstream in the discharge direction D2 is moved.

Further, the timing at which the downstream end portion of the discharged sheet S2 in the discharge direction D2 overlaps the paper sheet S1 at the first position Pt1 can be set appropriately. However, for example, in the case where the discharge tray 60 is not displaced to the second position Pt2 until the timing when the downstream end portion of the to-be-discharged paper sheet S2 in the discharge direction D2 overlaps the downstream end portion of the placed paper sheet S1 in the discharge direction D2, the paper sheet S2 may be discharged before the discharge tray 60 is displaced to the second position Pt2, and the to-be-discharged paper sheet S2 is not placed on the discharge tray 60 and falls off the discharge tray 60. Therefore, it is necessary to displace the discharge tray 60 to the second position Pt2 at a timing at which such a problem does not occur. Therefore, as a timing setting method, for example, the discharge tray 60 is set to be displaced to the second position Pt2 at a timing at which the downstream end portion of the to-be-discharged paper sheet S2 in the discharge direction D2 overlaps between 1/10 and 5/10 of the dimension of the placed paper sheet S1 in the discharge direction D2 from the upstream end portion of the paper sheet S1 in the discharge direction D2.

Next, a case will be described in which the operation of moving the discharge tray 60 from the stacking position of the first position Pt1 or the second position Pt2 to the storage position for storing the apparatus main body 20 is automatically performed.

For example, it may be necessary to replenish the paper sheet cassette 21 with the paper sheets S when the discharge tray 60 is protruding from the apparatus main body 20 at the stacking positions. In this case, since the paper sheet cassette 21 is located below the discharge tray 60, when the discharge tray 60 is protruding in the discharge direction D2, the discharge tray 60 interferes with the supply of the paper sheets S to the paper sheet cassette 21. In addition, the discharge tray 60 may interfere even in the case of setting of the paper sheets S in the paper sheet setting port on the rear surface of the apparatus main body 20. That is, the usability for the user is reduced.

In addition, in the case where the above situation occurs, for example, if a storage button for automatically storing the discharge tray 60 is set on the operation panel 4c, the discharge tray 60 can be easily moved to the storage position by pressing the storage button. However, if the storage button is always displayed on the operation panel 4c, the user may erroneously press it. For example, if the storage button is erroneously pressed when a paper jam error occurs, the discharge tray 60 moves to the apparatus main body 20 side, and the paper jam condition further deteriorates. In addition, if the storage button is pushed during printing, the discharged paper sheet S cannot be placed on the discharge tray 60, and in this case also, the usability for the user is reduced.

Therefore, in the present embodiment, the operation panel 4c is provided with a storage button 102d for storing the discharge tray 60 on the apparatus main body 20 side. The storage button 102d is displayed when the discharge tray 60 can be stored on the apparatus main body 20 side, and is hidden when the discharge tray 60 cannot be stored on the apparatus main body 20 side.

Figure 6:
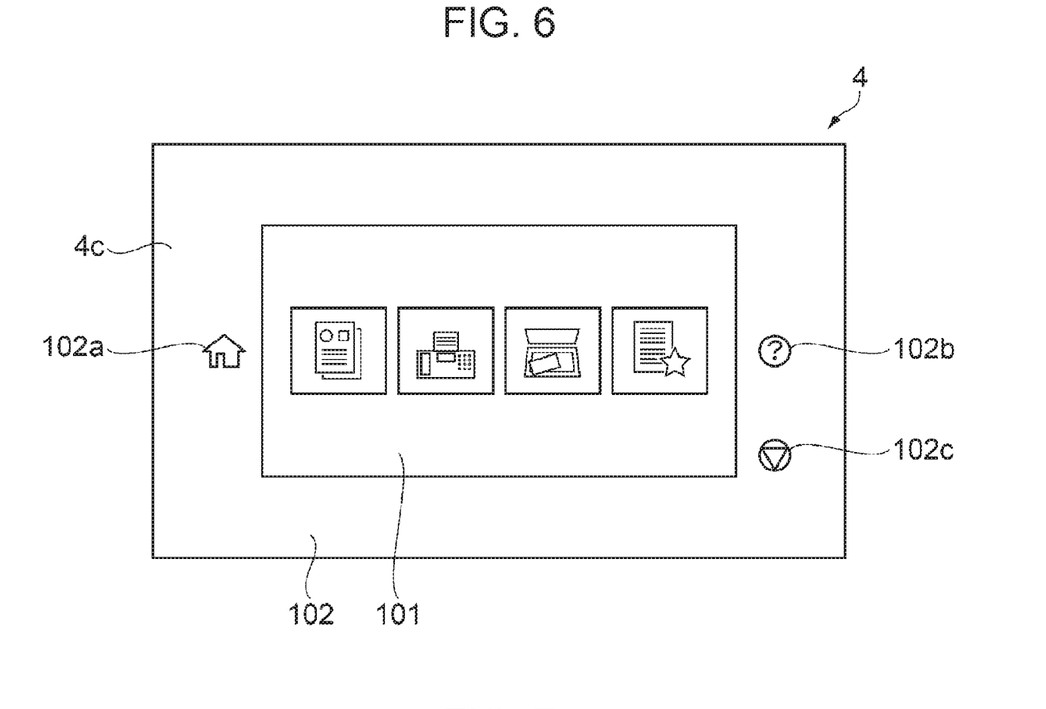
FIG. 6 is a schematic view illustrating display contents of an operation panel.
Figure 7:
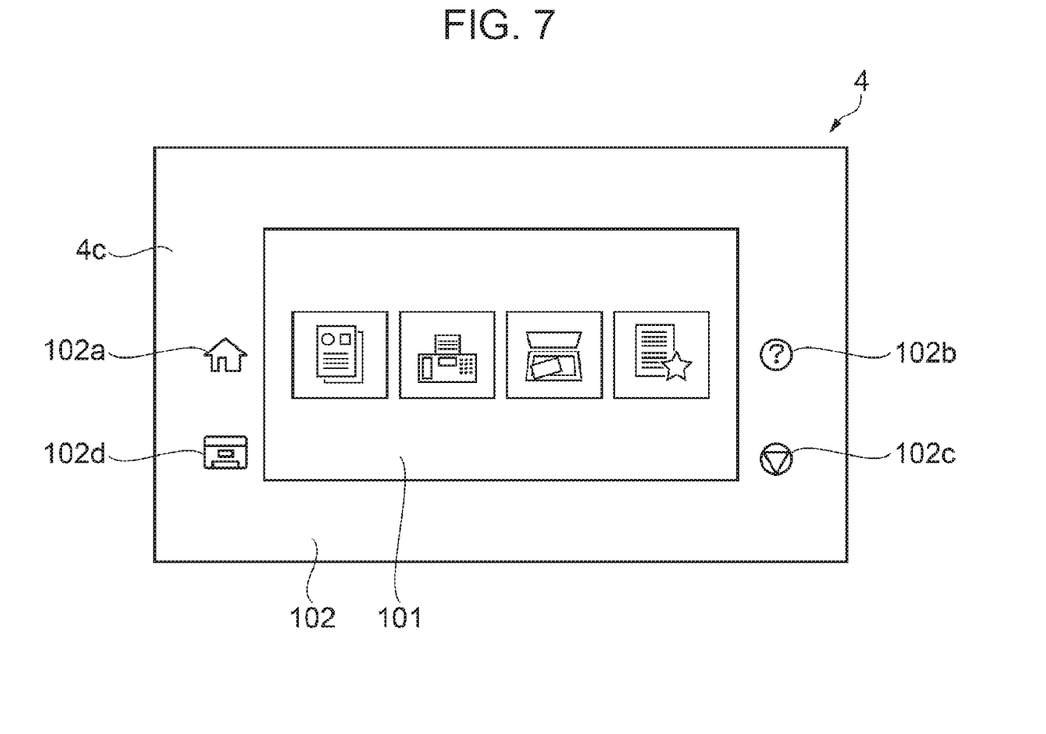
FIG. 7 is a schematic view illustrating the display contents of the operation panel.

Details will be described below. FIGS. 6 and 7 are schematic diagrams illustrating the display contents of the operation panel 4c. Specifically, FIG. 6 illustrates a state in which the storage button 102d is not displayed, and FIG. 7 illustrates a state in which the storage button 102d is displayed. As illustrated in FIGS. 6 and 7, the operation panel 4c of the present embodiment includes a first display portion 101 that is horizontally long in the central portion of the operation panel 4c, and a second display portion 102 that is provided on the outer peripheral portion of the first display portion 101.

The first display portion 101 is provided with icons for various processing menus such as copying and scanning. The user can perform various processes by touching the icon of a desired process. In addition, in the example of FIG. 6, four icons are displayed on the first display portion 101; however, other icons are provided and displayed in a hidden state. By scrolling in the longitudinal direction, the user can move the display and can access icons other than the above four icons.

A home button 102a, a help button 102b, and a cancel button 102c are constantly displayed on the second display portion 102. In addition, the storage button 102d is provided on the second display portion 102. The storage button 102d may be hidden as illustrated in FIG. 6 or may be displayed as illustrated in FIG. 7.

The second display portion 102 has a fixed display area, and the display does not move even if the second display portion 102 is scrolled. That is, the home button 102a, the help button 102b, the cancel button 102c, and the storage button 102d are fixedly disposed at predetermined positions.

The storage button 102d is in a non-display state, for example, during a printing operation or when a paper jam error occurs in which the paper sheet S is jammed in the transport path 17. On the other hand, when a paper-out error occurs in a standby state in which a printing process is not executed or when the paper sheet S is exhausted in the paper sheet cassette 21, the display state is displayed. Further, in the case where the storage button 102d is hidden, driving of the discharge tray 60 is disabled. That is, even when the position of the storage button 102d is pushed with the storage button 102d hidden, the discharge tray 60 does not move.

In the case where the storage button 102d is displayed, pressing the storage button 102d causes the discharge tray 60 to be stored to the storage position. Specifically, the drive motor is driven in reverse rotation, the pinion rotates following the drive of the drive motor, and the rack that meshes with the pinion moves, whereby the discharge tray 60 moves to the storage position.

In the case where the printing operation or a paper jam error occurs, the storage button 102d is hidden so as to prevent the user from accidentally pressing the storage button 102d. As a result, since the discharge tray 60 is not stored, it is possible to suppress the discharged paper sheet S from falling and the deterioration of a paper jam.

In the case where the standby state or the paper-out error occurs, by displaying the storage button 102d, the user can receive operation guidance and store the discharge tray 60 by pressing the storage button 102d once without being disturbed by the operation guidance. In addition, since the storage button 102d is provided on the second display portion 102 instead of the first display portion 101, it can be easily accessed without moving the display, and the operability is improved.

In addition, since the discharge tray 60 moves to the storage position, the paper sheet cassette 21 can be easily attached and detached. In addition, the paper sheet S can be easily set in the paper setting port on the rear surface of the apparatus main body 20, and the usability is improved.

2. Modification 1

In the above embodiment, the detection portion 80 is disposed between the pair of transport rollers 29 and the pair of transport rollers 31, but the present disclosure is not limited to this. For example, the detection portion 80 may be disposed in the transport path 17 between the recording head 25 and the pair of paper discharge rollers 50 or between the pair of paper discharge rollers 50 and the pair of paper discharge rollers 51. That is, the detection portion 80 may be disposed at a position where the timing at which the downstream end portion of the to-be-discharged paper sheet S2 in the discharge direction D2 overlaps the paper sheet S1 at the first position Pt1 can be detected. Even in this case, the same effect as described above can be obtained.

3. Modification 2

Although the detection portion 80 having the light emitting portion 80a and the light receiving portion 80b is used in the above-described embodiment, the present disclosure is not limited to this. For example, the position of the to-be-discharged paper sheet S may be detected by an encoder. In this case, for example, a rotary encoder is disposed on one roller of the pair of transport rollers 31, and the discharge tray 60 is drive-controlled on the basis of the detection data of the rotary encoder. Even in this case, the same effect as described above can be obtained.

4. Modification 3

In the above embodiment, the discharge tray 60 is displaced at the timing when it is determined that there is no paper sheet S2 on the basis of the detection of the detection portion 80; however, the present disclosure is not limited to this. For example, the discharge tray 60 may be displaced at the timing when the paper sheet S2 passes through the pair of transport rollers 31 as the transport rollers. The timing at which the paper sheet S2 passes through the pair of transport rollers 31 is detected by, for example, an optical sensor or encoder. Even in this case, the same effect as described above can be obtained.

5. Modification 4

In the above embodiment, the discharge tray 60 is displaced at the timing when it is determined that there is no paper sheet S2 on the basis of the detection of the detection portion 80; however, the present disclosure is not limited to this. For example, the discharge tray 60 may be displaced from the first position Pt1 to the second position Pt2 in accordance with a print duty of the paper sheet S2.

In the case where the print duty of the paper S2 is high, since the amount of ink applied on the paper sheet S2 is larger than that when the print duty of the paper S2 is low, when the paper sheet S2 is discharged from the discharge port 52, the paper sheet S2 hangs downward at an early point. Therefore, in the case where the print duty of the paper sheet S2 is high, the discharge tray 60 is displaced to the second position Pt2 at a later timing than when the print duty of the paper sheet S2 is low. In this case, a plurality of optical sensors may be provided in the transport direction D1 to correspond to the print duty, or an encoder may be provided and the number of steps output from the encoder may correspond to the print duty. Even in this case, the discharge tray 60 can be displaced to the second position Pt2 at the timing when the downstream end portion of the discharged paper sheet S2 in the discharge direction D2 overlaps the paper sheet S1 at the first position Pt1 with certainty.

6. Modification 5

In the above embodiment, the discharge tray 60 is displaced at the timing when it is determined that there is no paper sheet S2 on the basis of the detection of the detection portion 80; however, the present disclosure is not limited to this. For example, the discharge tray 60 may be displaced from the first position Pt1 to the second position Pt2 in accordance with a thickness of the paper sheet S2.

In the case where the thickness of the paper sheet S2 is small, since the rigidity of the paper sheet S2 is lower than that when the paper sheet S2 is thick, when the paper sheet S2 is discharged from the discharge port 52, the paper sheet S2 hangs downward at an early point. Therefore, when the thickness of the paper sheet S2 is small, the discharge tray 60 is displaced to the second position Pt2 at a later timing than when the thickness of the paper sheet S2 is large. In this case, the timing may be measured by associating the thickness of the paper sheet S2 with the number of steps output from the encoder. Even in this case, the discharge tray 60 can be displaced to the second position Pt2 at the timing when the downstream end portion of the discharged paper sheet S2 in the discharge direction D2 overlaps the paper sheet S1 at the first position Pt1 with certainty.

7. Modification 6

In the above embodiment, the discharge tray 60 is displaced at the timing when it is determined that there is no paper sheet S2 on the basis of the detection of the detection portion 80; however, the present disclosure is not limited to this. For example, the discharge tray 60 may be displaced from the first position Pt1 to the second position Pt2 in accordance with the environment in which the recording apparatus 1 is installed. For example, the discharge tray 60 is displaced from the first position Pt1 to the second position Pt2 in accordance with the humidity.

In the case where the humidity is high, since the amount of water contained in the paper sheet S2 is larger than that when the humidity is low, the rigidity becomes low, and when the paper sheet S2 is discharged from the discharge port 52, the paper sheet S2 hangs downward at an early point. Therefore, when the humidity is high, the discharge tray 60 is displaced to the second position Pt2 at a later timing than when the humidity is low. Even in this case, the same effect as described above can be obtained.

8. Modification 7

In the above embodiment, the paper sheet S1 has an A4 size and the paper sheet S2 has an A3 size, but the present disclosure is not limited to this. With regard to the relationship between the paper sheet S1 and the paper sheet S2, the paper sheet S2 can be adopted as long as the paper sheet S2 is larger than the paper sheet S1 in the discharge direction D2.

The contents derived from the above embodiment will be described below.

According to an aspect of the present disclosure, a recording apparatus includes an apparatus main body including a recording portion configured to record on a first medium and a second medium larger than the first medium, a media receiving portion configured to be displaced along a discharge direction in which the first medium and the second medium are discharged, and that is displaced between a storage position in which the media receiving portion is stored on the apparatus main body side and stacking positions in which the media receiving portion protrudes in the discharge direction from the storage position and receives the media, a drive source that drives the media receiving portion for the displacement between the storage position and the stacking positions, and a transmitter for transmitting the power of the drive source to the media receiving portion, in which stacking positions of the media receiving portion include a first position and a second position that projects downstream from the first position, and after receiving the first medium at the first position, when the second medium is discharged, the media receiving portion is displaced to the second position downstream of the first position in the discharge direction at a timing when a downstream end portion of the to-be-discharged second medium in the discharge direction overlaps the first medium at the first position by a predetermined amount.

According to this configuration, when discharging the second medium in a state in which the first medium has been placed on the media receiving portion at the first position, the media receiving portion is displaced to the second position at the timing when the downstream end portion of the second medium to be discharged in the discharge direction overlaps the first medium at the first position. That is, the to-be-discharged second medium is placed on the first medium with certainty. Therefore, when discharging the second medium, because the front end portion of the second medium does not come into contact with the rear end portion of the first medium and push the first medium out, the first medium can be suppressed from falling off the media receiving portion.

In the recording apparatus, the media receiving portion may include a first tray and a second tray slidably coupled to the first tray in the discharge direction, at the storage position, the media receiving portion may be in a first state in which the first tray and the second tray overlap each other, and, at the stacking positions, may be in a second state in which the second tray is located downstream of the first tray in the discharge direction.

According to this configuration, the media receiving portion can be expanded and contracted in the discharge direction through the first tray and the second tray. Therefore, the recording apparatus can be decreased in size, and the area occupied by the recording apparatus can be reduced.

In the recording apparatus, after the first tray and the second tray have been moved to the first position and received the first medium while in the second state, and when the second medium is to be discharged, at the timing when the downstream end portion of the to-be-discharged second medium in the discharge direction overlaps the first medium at the first position by a predetermined amount of the second medium, in a state in which the second state is maintained, it is preferable that only the first tray move downstream in the discharge direction and the media receiving portion be displaced to the second position.

According to this aspect, when displacing the media receiving portion to the second position, because only the first tray upstream in the discharge direction is moved, compared with the configuration in which only the second tray downstream in the discharge direction is moved, the size of the recording apparatus can be reduced, and the contact between the front end portion of the second medium and the rear end portion of the first medium can be suppressed in order to suppress the first medium from falling off the media receiving portion.

The recording apparatus may further include transport rollers that transport the first medium and the second medium and that are upstream of the recording portion, in which, when the second medium passes through the transport rollers, the media receiving portion is displaced to the second position.

According to this configuration, it is possible to displace the to-be-discharged second medium to the second position at the timing when the downstream end portion of the second medium in the discharge direction overlaps the first medium at the first position with certainty.

In the recording apparatus, the media receiving portion is preferably displaced to the second position in accordance with a print duty of the second medium.

According to this aspect, it is possible to displace the media receiving portion to the second position at the timing when the downstream end portion of the discharged second medium in the discharge direction overlaps the first medium at the first position with certainty.

In the recording apparatus, the media receiving portion is preferably displaced to the second position in accordance with the thickness of the second medium.

According to this aspect, it is possible to displace the media receiving portion to the second position at the timing when the downstream end portion of the discharged second medium in the discharge direction overlaps the first medium at the first position with certainty.

The recording apparatus may further include an operation panel provided with a storage button for storing the media receiving portion on the apparatus main body side, in which the storage button is displayed when the media receiving portion can be stored on the apparatus main body side, and is hidden when the media receiving portion cannot be stored on the apparatus main body side.

According this aspect, it is possible to improve the operability for the user when storing the media receiving portion.

What is claimed is:

1. A recording apparatus comprising: an apparatus main body including a recording portion configured to record on a first medium and a second medium larger than the first medium;
    a media receiving portion configured to be displaced along a discharge direction in which the first medium and the second medium are discharged, and that is displaced between a storage position in which the media receiving portion is stored on the apparatus main body side and stacking positions in which the media receiving portion protrudes in the discharge direction from the storage position and receives the media;
    a drive source that drives the media receiving portion for the displacement between the storage position and the stacking positions, wherein
stacking positions of the media receiving portion include a first position and a second position that protrudes downstream from the first position, and after receiving the first medium at the first position, when the second medium is discharged, the media receiving portion is displaced to the second position downstream of the first position in the discharge direction at a timing when a downstream end portion of the to-be-discharged second medium in the discharge direction overlaps the first medium at the first position by a predetermined amount.

2. The recording apparatus according to claim 1, wherein the media receiving portion includes a first tray and a second tray slidably coupled to the first tray in the discharge direction,
    at the storage position, the media receiving portion is in a first state in which the first tray and the second tray overlap each other, and
    at the stacking positions, the media receiving portion is in a second state in which the second tray is located downstream of the first tray in the discharge direction.

3. The recording apparatus according to claim 2, wherein after the first tray and the second tray have been moved to the first position and received the first medium while in the second state, and when the second medium is to be discharged, at a timing at which the downstream end portion of the to-be-discharged second medium in the discharge direction overlaps the first medium at the first position by a predetermined amount of the second medium, in a state in which the second state is maintained, only the first tray moves downstream in the discharge direction and the media receiving portion is displaced to the second position.

4. The recording apparatus according to claim 1, further comprising:
    transport rollers that transport the first medium and the second medium and that are provided upstream of the recording portion, wherein
    when the second medium passes through the transport rollers, the media receiving portion is displaced to the second position.

5. The recording apparatus according to claim 1, wherein the media receiving portion is displaced to the second position in accordance with a print duty of the second medium.

6. The recording apparatus according to claim 1, wherein the media receiving portion is displaced to the second position in accordance with a thickness of the second medium.

7. The recording apparatus according to claim 1, further comprising:
    an operation panel provided with a storage button for storing the media receiving portion on the apparatus main body side, wherein
    the storage button is displayed when it is possible to store the media receiving portion on the apparatus main body side, and is hidden when it is not possible to store the media receiving portion on the apparatus main body side.

* * * * *